United States Patent [19]
Tseng

[11] Patent Number: 5,973,866
[45] Date of Patent: Oct. 26, 1999

[54] LOCKING DEVICE FOR LOCKING A SCANNING MODULE IN A SCANNER

[75] Inventor: Jacky Tseng, Hsin-Chu Hsien, Taiwan

[73] Assignee: Mustek System Inc., Hsin-chu, Taiwan

[21] Appl. No.: 09/159,428

[22] Filed: Sep. 22, 1998

[51] Int. Cl.$^6$ .................................................. G02B 26/08
[52] U.S. Cl. ........................................... 359/896; 359/196
[58] Field of Search .................................. 359/196–226, 359/896; 358/474, 494, 497; 399/107

[56] References Cited

U.S. PATENT DOCUMENTS 5,576,530  11/1996  Hagerty ..................................... 235/472
5,760,926  6/1998  Howard et al. ........................... 358/498

*Primary Examiner*—James Phan
*Attorney, Agent, or Firm*—Winston Hsu

[57] ABSTRACT

The present invention provides a locking device for locking a scanning module in a scanner. The locking device comprises a protruding member installed on the scanning module, a C-shaped shaft sink and an elastic button installed on the bottom panel of the housing of the scanner, an recess installed at the right edge of the housing, a blocking member rotatably installed in the shaft sink for separately locking the protruding member of the scanning module, and a sliding member slidably installed in the recess for horizontally rotating the blocking member to lock or release the protruding member of the scanning module.

5 Claims, 4 Drawing Sheets

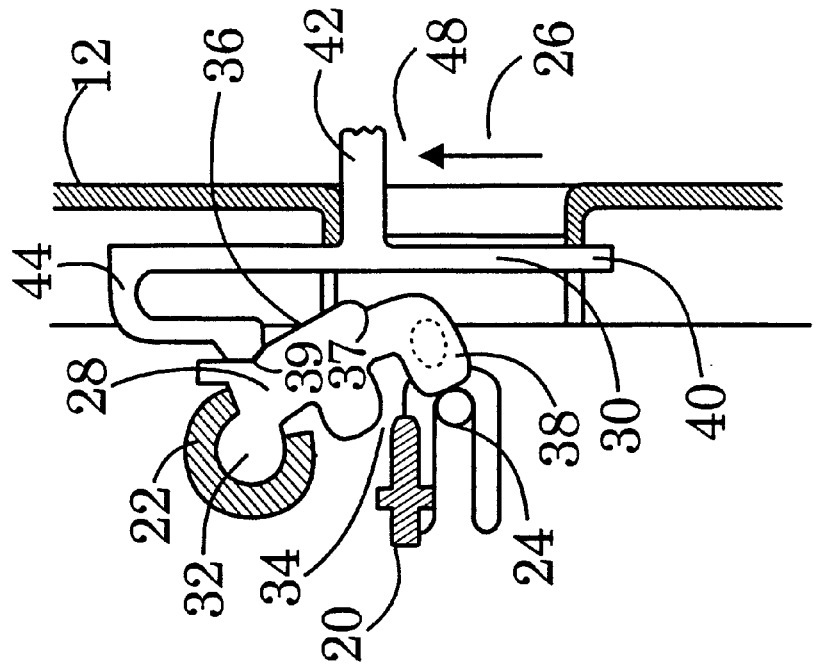
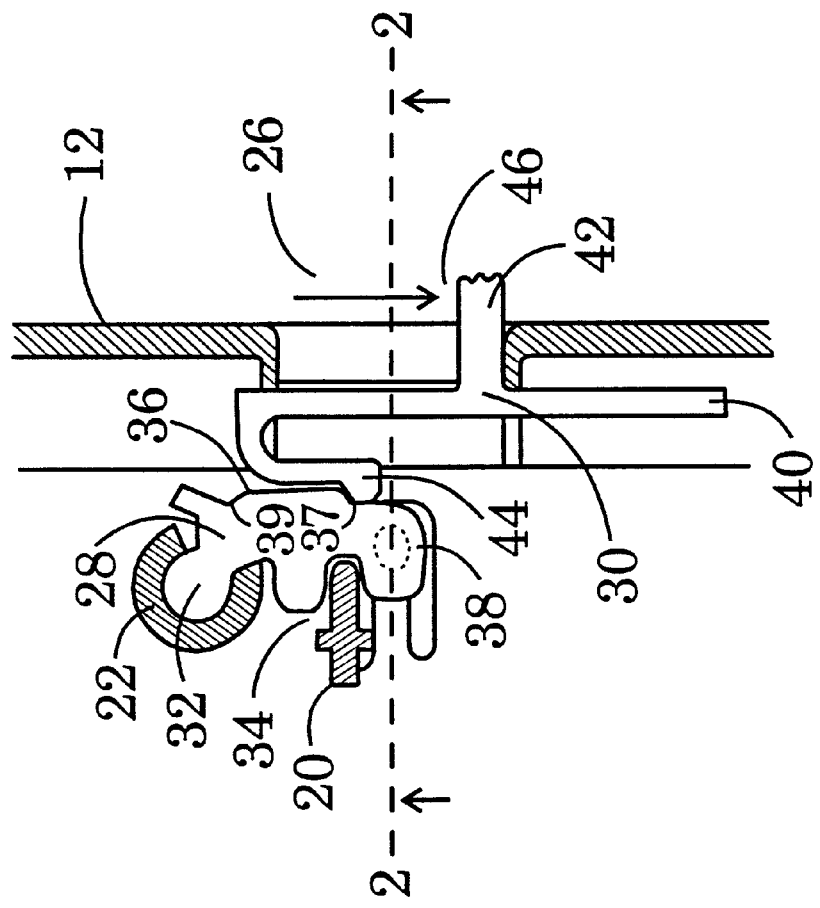
*FIG. 6*
*FIG. 5*

LOCKING DEVICE FOR LOCKING A SCANNING MODULE IN A SCANNER

BACKGROUND OF THE INVENTION

1. Field of the Invention

The present invention relates to a scanner, and more particularly, to a locking device for locking a scanner module of a scanner.

2. Description of the Prior Art

Scanning module is considered the most important part of a flat-bed scanner. A scanning module is movably installed in a scanner so that it can be used to scan a document placed on a transparent platform of a scanner. Inside a scanning module, there are many highly sensitive and intricately arranged optical components. If a scanning module is not fixed inside a scanner when shipping, the scanning module may slides inside the scanner and cause severe damage to the components inside the scanning module. Various locking devices are therefore provided in prior art scanners for locking a scanning module of a scanner when the scanner is moved or shipped.

Screws are traditionally used to firmly fix the scanning module to the housing of a scanner. However, the screws are often mounted on the underside of a scanner's housing which causes great inconvenience to a user because the scanner must be turned upside down when accessing the screws.

SUMMARY OF THE INVENTION

It is therefore a primary objective of the present invention to provide a locking device for easily locking the scanning module in a scanner to solve the above mentioned problem.

In a preferred embodiment, the present invention provides A locking device for locking a scanning module in a scanner which comprises a housing with a transparent platform for placing a document to be scanned, and a scanning module installed in the housing in a horizontally slidable manner for scanning the document placed on the transparent platform, the locking device comprising:

a protruding member fixed to the scanning module;

a shaft sink installed in the housing of the scanner;

a blocking member comprising a shaft and a hook positioned at two opposite ends of the blocking member, and a sliding surface positioned at an opposite side of the hook, wherein the shaft is fixed in the shaft sink in a horizontally rotatable manner, and the hook is used for locking the protruding member of the scanning module so as to fix the scanning module;

a recess installed at one side of the housing;

a sliding member comprising a sliding panel slidably installed in the recess, and an elastic arm fixed at one side of the sliding panel for contacting the sliding surface of the blocking member to horizontally rotate the block element;

wherein when the scanning module is positioned at a predetermined position in the housing, the sliding member can be moved to a locking position wherein the elastic arm of the sliding member rotates the blocking member forward to engage the hook of the blocking member with the protruding member of the scanning module when the sliding member is moved to the locking position so that the scanning module is locked in the scanner; and wherein the sliding panel can be moved away from the locking position wherein the elastic arm of the sliding member rotates the blocking member backward to release the hook from the protruding member when the sliding member is moved away from the locking position so that the scanning module can be horizontally moved in the scanner.

It is an advantage of the present invention that the locking device is designed as a common switch which is very convenient for use and therefore can easily lock or release the scanning module in the scanner.

These and other objectives of the present invention will no doubt become obvious to those of ordinary skill in the art after reading the following detailed description of the preferred embodiment which is illustrated in the various figures and drawings.

BRIEF DESCRIPTION OF THE DRAWINGS

FIG. 5 is an up view of the locking device shown is FIG. 2 in a locking state.

FIG. 6 is an up view of the locking device shown in FIG. 2 in an unlocking state.

DETAILED DESCRIPTION OF THE PREFERRED EMBODIMENT

Figure 1:
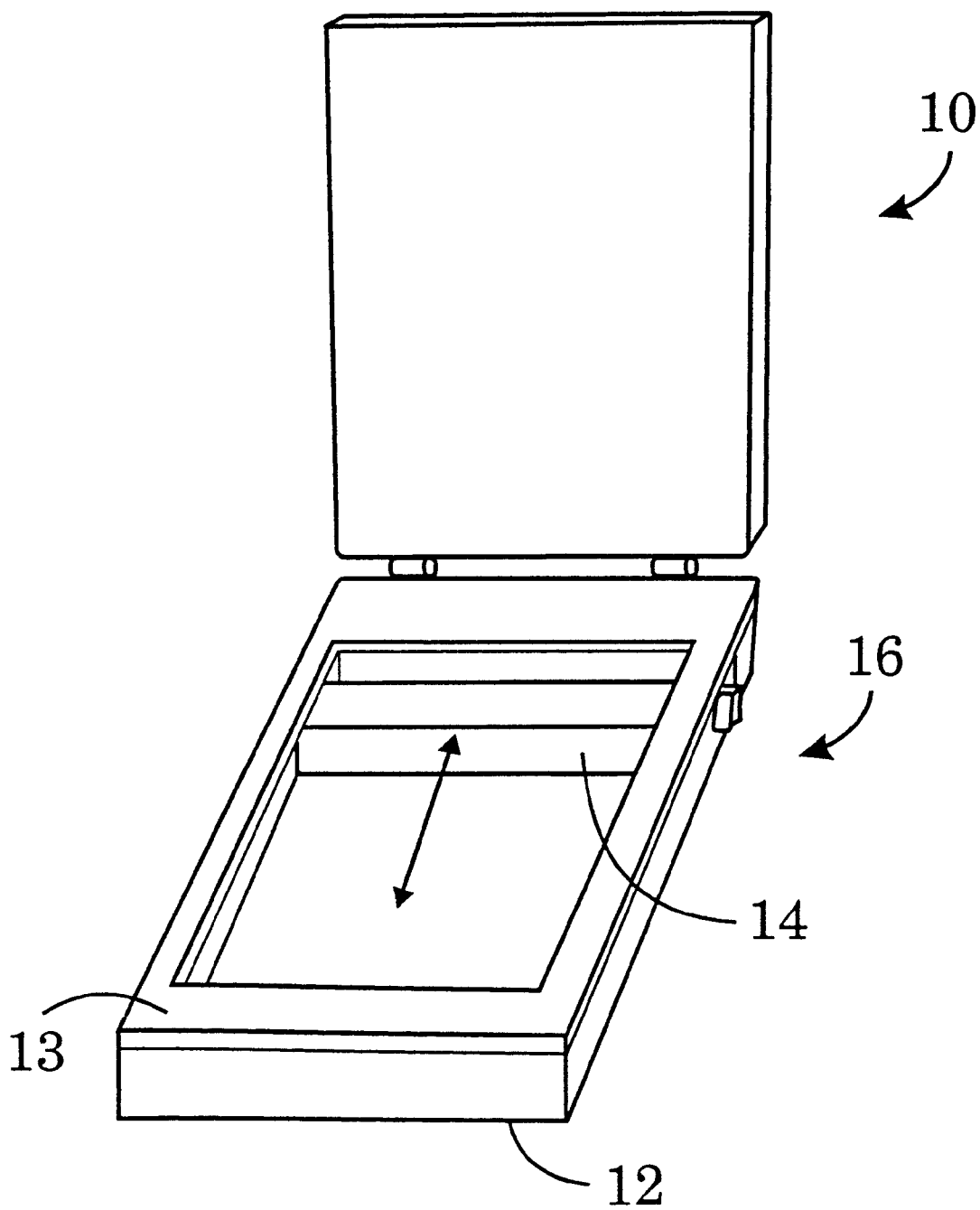
FIG. 1 is a perspective diagram of a scanner with a scanning module locking device according to the present invention.

Please refer to FIG. 1. FIG. 1 shows a scanner 10 with a scanning module locking device according to the present invention. The scanner 10 comprises a housing 12 having a transparent platform, a scanning module 14 movably installed in the housing 12 for scanning a document placed on the transparent platform of the housing, and a locking device 16 installed at the back right end of the scanner 10 for locking the scanning module 14 at the back of the housing 12. The housing 12 comprises an upper chassis 13 and a lower chassis being formed by front, rear, left and right side panels and a bottom panel.

Figure 2:
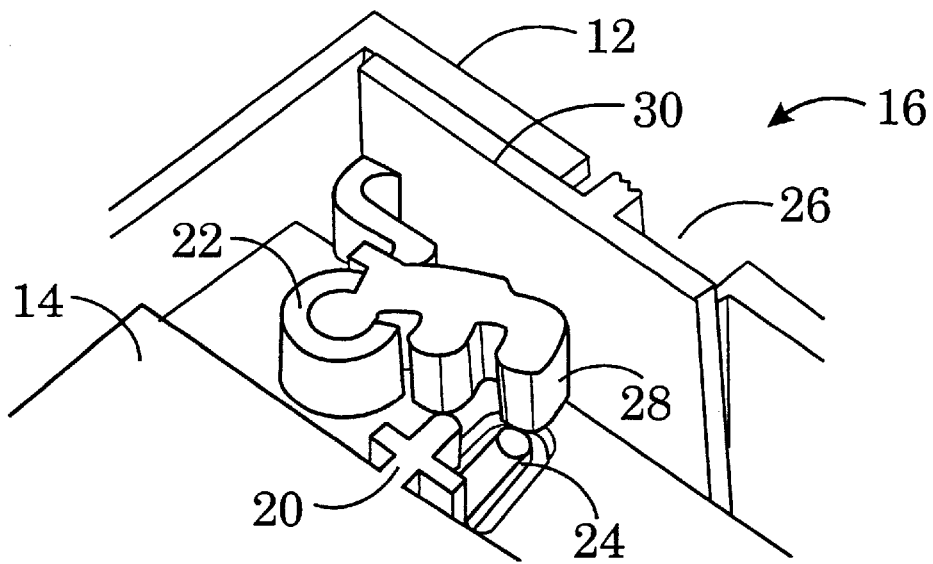
FIG. 2 is a perspective diagram of the locking device shown in FIG. 1.

Please refer to FIG. 2. FIG. 2 is a perspective diagram of the locking device 16 shown in FIG. 1. The locking device 16 comprises a protruding member 20 installed on the scanning module 14, a C-shaped shaft sink 22 installed on the bottom panel of the housing 12, an recess 26 installed at the right edge of the housing 12, a blocking member 28 rotatably installed in the shaft sink 22 for engaging the protruding member 20 of the scanning module 14, and a sliding member 30 slidably fixed in the recess 26 for horizontally rotating the blocking member 28 so as to engage or release the protruding member 20.

Figure 3:
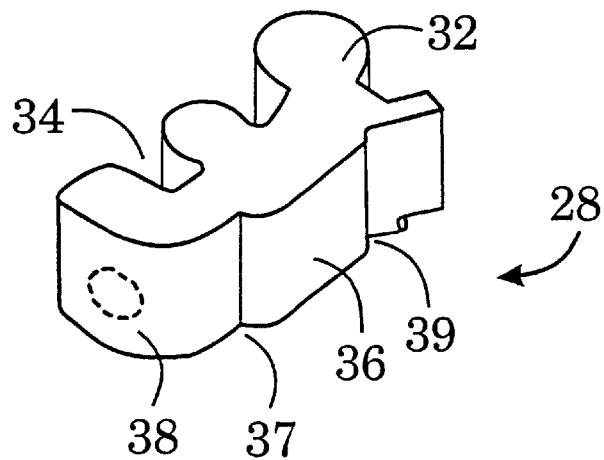
FIG. 3 is a perspective diagram of the blocking member shown in FIG. 2.

Please refer to FIG. 3. FIG. 3 is a perspective diagram of the blocking member 28. The blocking member 28 comprises a shaft 32 and a hook 34 installed at two correspondent ends of the blocking member 28 and a sliding surface 36 installed at the opposite side of the hook 34. The blocking member 28 further comprises a hole 38 installed at the bottom side of the hook 34 with a corresponding elastic button 24 installed on the housing 12 wherein the elastic button 24 is inserted into the hole 38. The shaft 32 is in a horizontal orientation and is movably installed in the shaft sink 22 of the housing 12. The hook 34 is used for engaging the protruding member 20 of the scanning module 14 so as to fix the scanning module 14.

Figure 4:
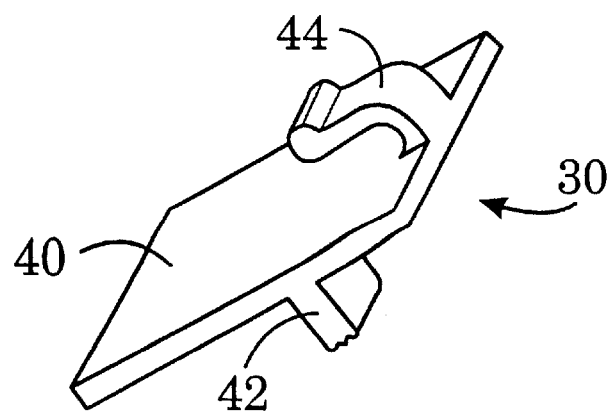
FIG. 4 is a perspective diagram of the sliding member shown in FIG. 3.

Please refer to FIG. 4. FIG. 4 is a perspective diagram of the sliding member 30. The sliding member 30 comprises a sliding panel 40 slidably installed in the recess 26, a stick 42 installed on one side of the sliding member 40 oriented toward the recess 47, and an elastic arm 44 fixed at the other side of the sliding member opposite to the stick 42 for horizontally rotating the blocking member 28 through elastic contacts with the sliding surface 36 of the blocking member 28. The sliding surface 36 has a jutting edge and two recessions 37,39 at two sides of the jutting edge. When the elastic arm 44 of the blocking member 30 slides from the jutting edge to one of the recessions 37,39, the elastic arm 44 is first pressed then released causing the release of elastic potential energy which causes the blocking member 28 to rotate around the shaft 32.

Please refer to FIG. 5. FIG. 5 shows the locking device 16 in a locked state. When the scanning module 14 is positioned at the back of the scanner 10 and the stick 42 of the sliding member 30 is moved to the front end of the recess 26 of the housing 12, the elastic arm 44 of the sliding member 30 slides over the sliding surface 36 of the blocking member 28 to the recession 37 causing the blocking member 28 to rotate clockwise. At the same time, the elastic button 28 of the housing 12 is inserted into the hole 38 of the blocking member 28 and the hook 34 of the blocking member 28 locks in the protruding member 20 of the scanning module 14. Since the shaft sink 22 is C-shaped, the blocking member 28 is restricted to a fixed angle of rotation. When the blocking member 28 rotates clockwise a certain distance, the upper left side of the blocking member 28 is stopped by the lower edge of the C-shaped open of the shaft sink 22 so as to the prevent the blocking member 28 from making further clockwise rotation. Also, the elastic arm 44 of the sliding member 30 supports the recession 37 of the blocking member 28 so as to prevent the blocking member 28 from making unwanted counterclockwise rotation movements. Moreover, the elastic button 28 is inserted into the hole 38 of the blocking member 28. These all serve to firmly fix the blocking member 28 which in turn firmly fixes the scanning module 14 by using the hook 34 to lock in the protruding member 20 of the scanning module 14.

Please refer to FIG. 6. FIG. 6 is a top view of the locking device 16 in an unlocked state. When the stick 42 of the sliding member 30 is moved to the back end 48 of the recess 26, the elastic arm 44 slides over the sliding surface 36 to the recession 39 causing the blocking member 28 to rotate in a counterclockwise direction. After the blocking member 28 is rotated a certain distance, the upper right end of the blocking member 28 is stopped by the upper end of the C-shaped opening so as to prevent further counterclockwise rotation of the blocking member 28. At the same time, the elastic arm 44 of the sliding member 30 presses the blocking member 28 to prevent the blocking member 28 from rotating clockwise. Also, the hole 38 of the sliding member 30 slides away from the elastic button 24 now against the lower left edge of the sliding member 28. Therefore, the sliding member 30 and the blocking member 28 will not return to their original positions if the stick 42 is not moved. Since the hook 34 of the blocking member 28 separates with the protruding member 20 of the scanning module 14, the scanning module 14 can move in the scanner 10.

Figure 7:
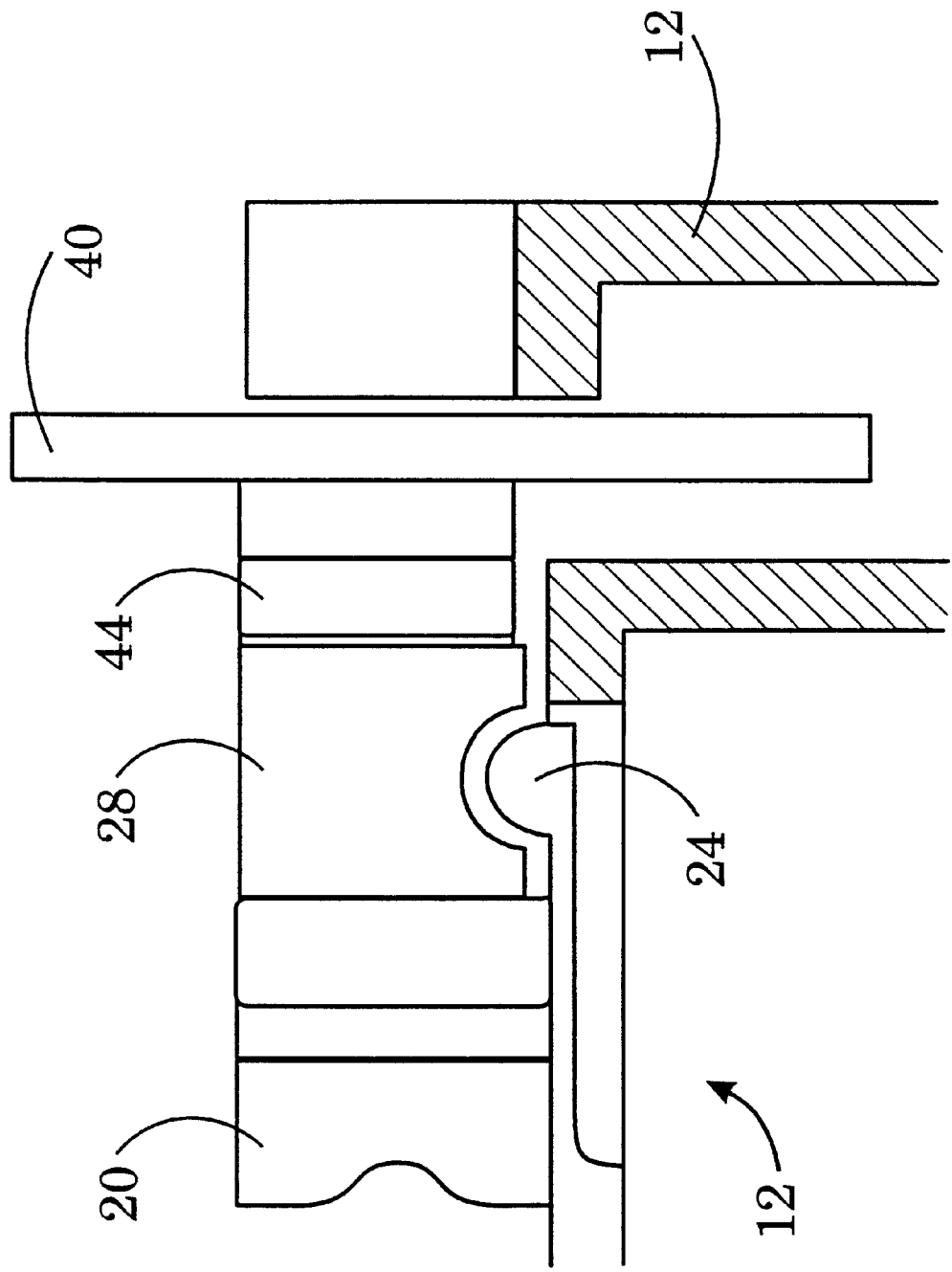
FIG. 7 is a sectional view along line 2—2 of the locking device shown in FIG. 5.

Please refer to FIG. 7. FIG. 7 is a sectional view along line 2—2 of the locking device 16 shown in FIG. 5. It can be seen clearly from FIG. 7 that the elastic button 24 of the housing 12 is a long arm extending from the bottom panel of the housing 12. The structure and operation of the elastic button 24 are very similar to those of the elastic arm 44 of the sliding member 30; both generating elasticity based on torque and characteristic of the material.

In order to strengthen the fixing power of the locking device 16, the upper chassis 13 can comprise a protruding element on the underside of the upper chassis corresponding to the position of the blocking member 28 on the bottom panel of the housing 12. When the upper chassis 13 is mounted on the lower chassis, the length of the protruding element will be just right to support the blocking member 28 to ensure the sliding member 28 will only move horizontally.

Compared with the prior art locking device that uses screws, the locking device 16 of the present invention is designed to operate as a switch and as such can easily lock or release the scanning module 14 by moving the stick 42. Also, since the locking device 16 is installed at the lateral edge of the scanner 12, it can be conveniently accessed and operated.

Those skilled in the art readily observe that numerous modifications and alterations of the device may be made while retaining the teachings of the invention. Accordingly, the above mentioned disclosure should be construed as limited only by the metes and bounds of the appended claims.

What is claimed is:

1. A locking device for locking a scanning module in a scanner which comprises a housing with a transparent platform for placing a document to be scanned, and a scanning module installed in the housing in a horizontally slidable manner for scanning the document placed on the transparent platform, the locking device comprising:

a protruding member fixed to the scanning module;

a shaft sink installed in the housing of the scanner;

a blocking member comprising a shaft and a hook positioned at two opposite ends of the blocking member, and a sliding surface positioned at an opposite side of the hook, wherein the shaft is fixed in the shaft sink in a horizontally rotatable manner, and the hook is used for locking the protruding member of the scanning module so as to fix the scanning module;

a recess installed at one side of the housing;

a sliding member comprising a sliding panel slidably installed in the recess, and an elastic arm fixed at one side of the sliding panel for contacting the sliding surface of the blocking member to horizontally rotate the block element;

wherein when the scanning module is positioned at a predetermined position in the housing, the sliding member can be moved to a locking position wherein the elastic arm of the sliding member rotates the blocking member forward to engage the hook of the blocking member with the protruding member of the scanning module when the sliding member is moved to the locking position so that the scanning module is locked in the scanner; and wherein the sliding panel can be moved away from the locking position wherein the elastic arm of the sliding member rotates the blocking member backward to release the hook from the protruding member when the sliding member is moved away from the locking position so that the scanning module can be horizontally moved in the scanner.

2. The locking device of claim 1 wherein the shaft sink is a C-shaped sink for limiting the rotating angle of the shaft of the blocking member in the shaft sink.

3. The locking device of claim 1 wherein the housing comprises an upper chassis and a lower chassis, the lower chassis being formed by front, rear, left and right side panels and a bottom panel wherein the scanning module is movably installed in the lower chassis housing and can be moved along a front-and-rear direction, the protruding member of the scanning module can be fixed at a right end or a left end of the scanning module, and the recess is installed at the right or left side panel corresponding to the position of the protruding member on the scanning module.

4. The locking device of claim 3 wherein the blocking member comprises a hole at a bottom side of its hook and the bottom panel of the housing comprises a correspondent elastic button for engaging the hole at the bottom side of the hook to detain the blocking member wherein when the blocking member is rotated to lock the protruding member of the scanning module by the sliding member, and the hole at the bottom side of the hook will engage with the elastic button in the same time so that the blocking member can be detained by the elastic button.

5. The scanner of claim 3 wherein the upper chassis of the scanner comprises a protruding element at its underside for engaging the blocking member wherein when the upper chassis is mounted on the lower chassis, the protruding element will press against the blocking member to prevent it from moving upward.

\* \* \* \* \*